Figure 3:
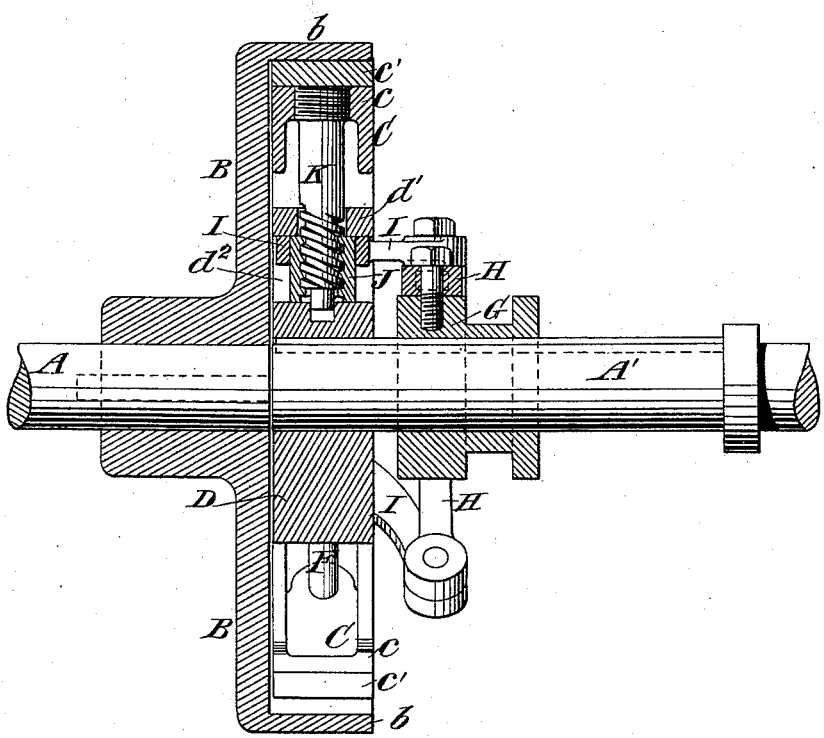

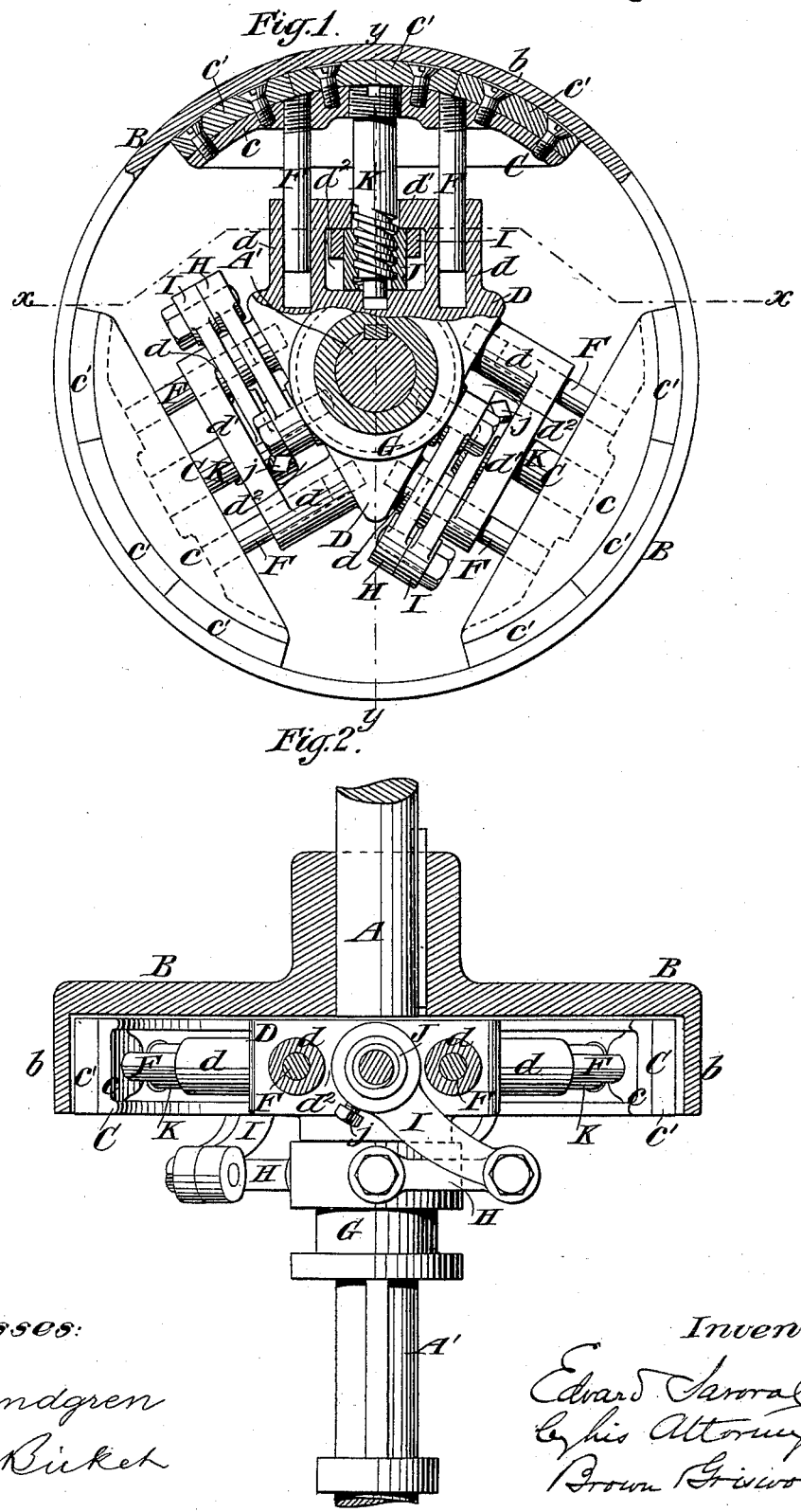

(No Model.) 2 Sheets—Sheet 2.

E. SAVORAL.
FRICTION CLUTCH.

No. 409,871. Patented Aug. 27, 1889.

Witnesses:

Inventor:
Edward Savoral
his Attorneys
Brown & Griswold

UNITED STATES PATENT OFFICE.

EDVARD SAVORAL, OF NEW YORK, N. Y.

FRICTION-CLUTCH.

SPECIFICATION forming part of Letters Patent No. 409,871, dated August 27, 1889.

Application filed June 15, 1889. Serial No. 314,487. (No model.)

*To all whom it may concern:*

Be it known that I, EDVARD SAVORAL, of the city, county, and State of New York, have invented a certain new and useful Improvement in Friction-Clutches, of which the following is a specification.

I will describe in detail a clutch embodying my improvement, and then point out the novel features in the claims.

In the accompanying drawings, Figure 1 is a face view of a friction-clutch embodying my improvement, partly in section. Fig. 2 is a horizontal section of the same, taken on the line $x\,x$, Fig. 1. Fig. 3 is a vertical section of the same, taken on the line $y\,y$, Fig. 1.

Similar letters of reference designate corresponding parts in all the figures.

A A′ designate two shafts, either of which may be driven. On the shaft A is mounted a hollow cylindrical friction-drum B, provided with a flange $b$, having a friction-surface upon its inner side. The drum B constitutes one member of the clutch. The other member of the clutch consists, as shown, of three parts C. Each of the parts C comprises a metallic block $c$, to the outer surfaces of which are secured pieces $c'$ of any suitable friction material—such, for instance, as leather or wood. In this instance such pieces are secured to the block $c$ by screws. The arc of the outer surfaces formed by the members C is the same as that of the inner surfaces of the flange $b$ of the member B.

Rigidly keyed upon the shaft A′ is a block D. The block D is in this instance triangular in shape. Extending from each of the sides of the triangular-shaped block D are projections. All these projections comprise tubular portions $d$. Uniting the tubular portions $d$ are connecting-pieces $d'$, such connecting-pieces being arranged near the outer ends of the tubular portions $d$ in such manner that spaces $d^2$ will be left between the block D, the projecting portions $d$, and the end pieces $d'$. Rigidly secured to the members C of the clutch (as here shown by screw-threads) are guide-rods F, which guide-rods extend inwardly and into the hollow portions $d$. These guide-rods, in conjunction with the hollow portions $d$, operate to guide the members C toward and from the flange $b$ of the member B in true courses.

G designates a collar, which as here shown is arranged upon the shaft A′. Said collar may be slid freely to and fro upon said shaft, but which at the same time will rotate thereon. A feathered connection is made between the shaft A′ and the collar G to admit of this. Pivotally connected near one of their ends to the collar G are links H, which links are pivotally connected near their other ends to levers I. The levers I near their inner ends are rigidly connected to nuts J, which nuts are arranged in the spaces $d^2$ between the tubular portions $d$. I have shown set-screws $j$ for thus connecting the lever I with the nuts J. Rigidly connected to the member C of the clutch are screws K, the screw-threads of which engage the nuts J. Said screws extend loosely through suitable apertures in the connecting-pieces $d'$ between the tubular pieces $d$.

It will be quite readily seen that when rotary motion is imparted to the nuts J and the screws are moved near to or farther from the shaft A′ they will carry with them the members C of the clutch, and will thus render the clutch operative or inoperative, according to the direction in which said screws are rotated. By moving the collar G upon the shaft A′ toward or from the block D motion will be transmitted through the links H, whereby the levers I will be rocked and the nuts J rotated in order to move the members C as desired.

It is to be observed that the screws K extend radially from the shaft A′, whereby I am enabled to use two, three, or even a greater number of the members C of the clutch, thus applying power directly and in radial lines at any desired number of points. The screws also, being rigidly secured to the members C, are non-rotary. This is advantageous, because it materially assists in strengthening the grip exerted by the members C.

What I claim as my invention, and desire to secure by Letters Patent, is—

1. In a friction-clutch, the combination, with two shafts, of a hollow flanged clutch member mounted upon one shaft, a block mounted upon the other shaft, clutch members arranged within said flanged member, guide-rods on said last-named clutch members and guided in said block, screws secured to said last-named clutch members and extending radially from the shaft last named, nuts adjacent to said block and engaging said screws, a collar on the shaft last named and adapted to be slid thereon, levers rigidly connected to said nuts, and links connecting said collar to said levers, substantially as specified.

2. The combination, with the shafts A A', of the hollow flanged clutch member B, mounted on the shaft A, the clutch members C within the clutch member B, the block D, rigidly secured to the shaft A' and provided with the tubular portions $d$, guide-rods F, extending from the clutch members C and into the tubular portions $d$, screws K, rigidly secured to the members C and extending radially from the shaft A', nuts J, arranged between the tubular portions $d$ and engaging the screws K, a sliding collar G on the shaft A, levers I, rigidly secured to the nuts J, and links H, connecting said levers with the collar G, substantially as specified.

EDVARD SAVORAL.

Witnesses:
FREDK. HAYNES,
GEO. BARRY.